(12) United States Patent
Kojovic et al.

(10) Patent No.: US 9,140,453 B2
(45) Date of Patent: Sep. 22, 2015

(54) FUEL MANIFOLD WITH JUMPER TUBES

(75) Inventors: Aleksandar Kojovic, Oakville (CA); Saeid Oskooel, Toronto (CA); Bryan Bond, Richmond Hill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 763 days.

(21) Appl. No.: 13/331,752

(22) Filed: Dec. 20, 2011

(65) Prior Publication Data
US 2013/0152590 A1 Jun. 20, 2013

(51) Int. Cl.
F23R 3/20 (2006.01)
F23R 3/28 (2006.01)
F02C 7/22 (2006.01)

(52) U.S. Cl.
CPC . *F23R 3/20* (2013.01); *F02C 7/222* (2013.01); *F23R 3/283* (2013.01); *F05D 2300/501* (2013.01)

(58) Field of Classification Search
CPC ............ F02C 7/236; F02C 7/22; F02C 7/222; F23R 3/28
USPC .......................... 60/739, 734, 39.37, 761, 746
See application file for complete search history.

(56) References Cited

U.S. PATENT DOCUMENTS

| | | | |
|---|---|---|---|
| 2,676,461 A | 4/1954 | Gove | |
| 2,690,648 A | 10/1954 | Pearce et al. | |
| 2,795,106 A | 6/1957 | Martin | |
| 2,806,354 A | 9/1957 | Cook | |
| 3,516,252 A | 6/1970 | Udell et al. | |
| 4,028,888 A | 6/1977 | Pilarczyk | |
| 4,402,184 A | 9/1983 | Faulkner et al. | |
| 4,409,791 A * | 10/1983 | Jourdain et al. | 60/240 |
| 4,467,610 A * | 8/1984 | Pearson et al. | 60/739 |
| 4,862,693 A * | 9/1989 | Batakis et al. | 60/739 |
| 5,031,407 A | 7/1991 | Zaremba et al. | |
| 5,168,698 A | 12/1992 | Peterson et al. | |
| 5,197,288 A | 3/1993 | Newland et al. | |
| 5,261,608 A * | 11/1993 | Hatzis et al. | 239/450 |
| 5,263,314 A * | 11/1993 | Anderson | 60/39.094 |
| 5,289,685 A | 3/1994 | Hoffa | |
| 5,390,498 A | 2/1995 | Sulkin | |
| 5,412,949 A | 5/1995 | Joland | |
| 6,339,924 B1 * | 1/2002 | Hoyer et al. | 60/772 |
| 6,711,898 B2 | 3/2004 | Laing et al. | |
| 2007/0044765 A1 * | 3/2007 | Lincourt | 123/466 |
| 2008/0112798 A1 * | 5/2008 | Seitzer et al. | 415/144 |
| 2010/0050645 A1 * | 3/2010 | Haggerty | 60/739 |
| 2010/0146928 A1 | 6/2010 | Morenko et al. | |

* cited by examiner

*Primary Examiner* — Gerald L Sung
(74) *Attorney, Agent, or Firm* — Norton Rose Fulbright Canada LLP

(57) ABSTRACT

A gas turbine engine fuel delivery system which includes an external fuel manifold fastened to the outer surface of a casing surrounding the combustor of the engine and which includes a plurality of inlet manifold tubes circumferentially disposed in serial flow communication. A plurality of fuel nozzles are mounted to the casing and are axially spaced apart from the fuel manifold on the outer surface of the casing. A plurality of jumper tubes are disposed outside the casing and feed fuel flow from the fuel manifold to the fuel nozzles. The jumper tubes have a rigidity that is less than that of the inlet manifold tubes of the fuel manifold such that the jumper tubes elastically deflect under load.

16 Claims, 2 Drawing Sheets

FUEL MANIFOLD WITH JUMPER TUBES

TECHNICAL FIELD

The present disclosure relates generally to gas turbine engines and, more particularly, relates to improved fuel supply assemblies and/or fuel manifolds for such engines.

BACKGROUND

Fuel supply assemblies for combustors of gas turbine engines are known to include an external fuel manifold extending around the combustor's outer casing to supply fuel to a plurality of fuel nozzles which extend into the combustor, through the outer casing, in order to injection fuel and/or air into the combustion chamber.

Fuel manifolds of this type may be assembled from a sequence of manifold adaptors and transfer tubes. The manifold adaptors support nozzles for injection of fuel into the combustor, and the transfer tubes interconnect the manifold adaptors, and form primary and secondary fuel-supply networks therewith, to supply the nozzles with fuel.

However, such external fuel manifolds are typically fastened in place with numerous brackets and clamp supports fixed to the casing, making assembly and/or removal of any individual fuel nozzles difficult in the field. Additionally, certain engine designs have fuel nozzles which are not aligned with engine axis, further complicating fuel manifold design and installation.

SUMMARY

There is therefore provided a fuel delivery system for a gas turbine engine having a combustor and a casing surrounding the combustor, the fuel delivery system comprising: an external fuel manifold disposed outside the casing and extending circumferentially therearound, the fuel manifold comprising a plurality of inlet manifold tubes circumferentially disposed in serial flow communication, each of the inlet manifold tubes being interconnected to a next circumferentially adjacent inlet manifold tube by a manifold adapter fastened to an outer surface of the casing; a plurality of circumferentially spaced apart fuel nozzles mounted to the casing, the fuel nozzles being axially spaced apart from the fuel manifold on the outer surface of the casing; and a plurality of jumper tubes disposed outside the casing and feeding fuel flow from the fuel manifold to the fuel nozzles, the jumper tubes having a rigidity that is less than that of the inlet manifold tubes of the fuel manifold such that the jumper tubes elastically deflect under load.

In another aspect, there is also provided a gas turbine engine including a multi-stage compressor, a combustor and a multi-stage turbine, the gas turbine engine comprising: an external fuel manifold disposed outside a casing surrounding the combustor and being fastened thereto; a plurality of circumferentially distributed fuel nozzles fastened to the casing and each having a radially outer end thereof which is disposed outside the casing and axially spaced apart from the external fuel manifold; and a plurality of jumper tubes disposed outside the casing and interconnecting in fuel flow communication the radially outer ends of the fuel nozzles and the external fuel manifold, the jumper tubes having a flexibility that is greater than that of the external fuel manifold such that the fuel nozzles bear substantially none of the load imposed on the casing by the weight of the fuel manifold.

Further details of these and other aspects will be apparent from the detailed description and figures included below.

BRIEF DESCRIPTION OF THE DRAWINGS

Reference is now made to the accompanying figures, in which.

DETAILED DESCRIPTION

Figure 1:
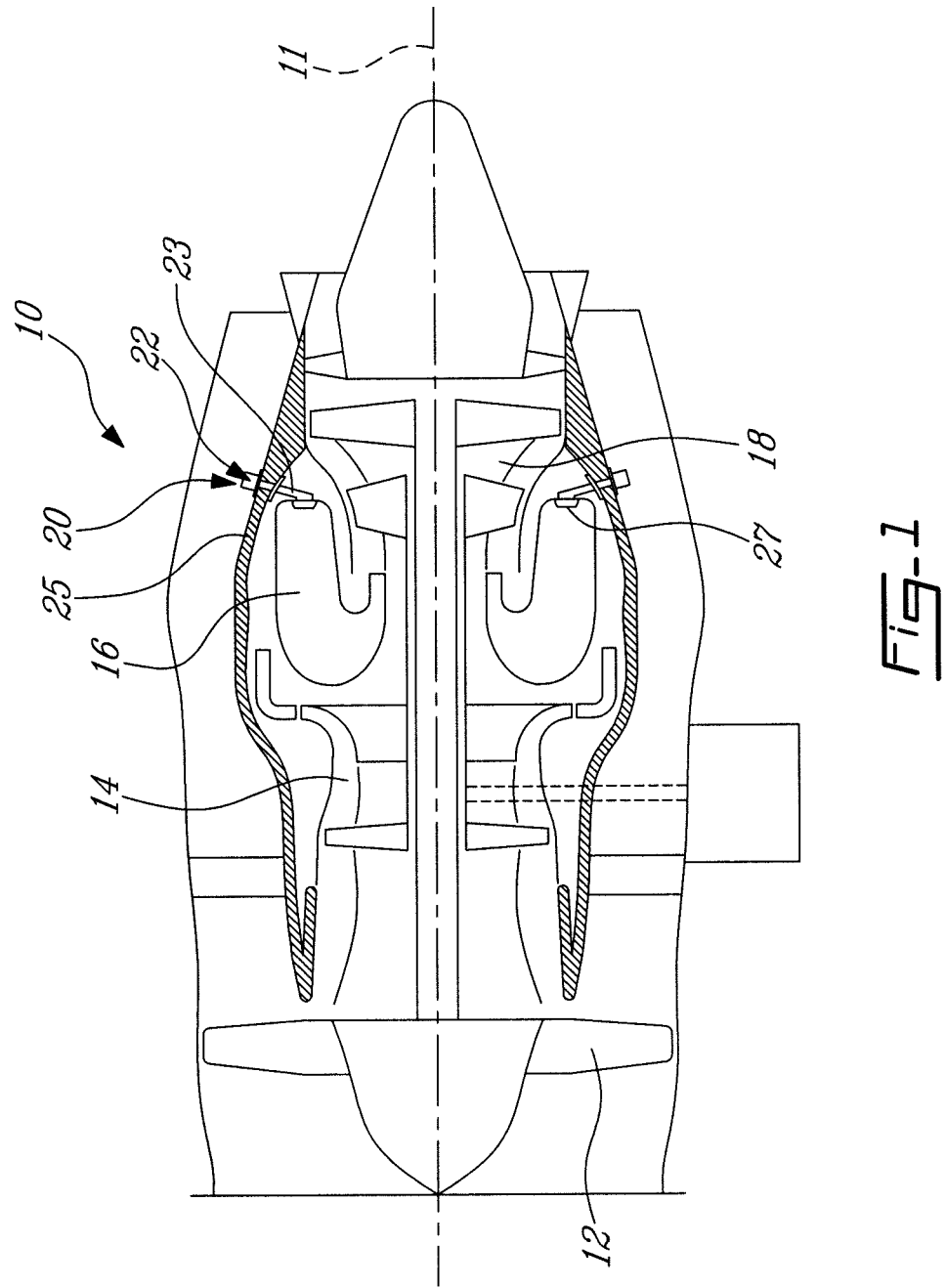
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fuel is fed into the combustor 16 by means of a fuel supply assembly 20, as will be described.

A longitudinal main engine axis 11 extends through the center of the engine. The terms "longitudinal", "axial", "radial" and "circumferential" as used herein are intended to define directions relative to this main engine axis 11.

Figure 2:
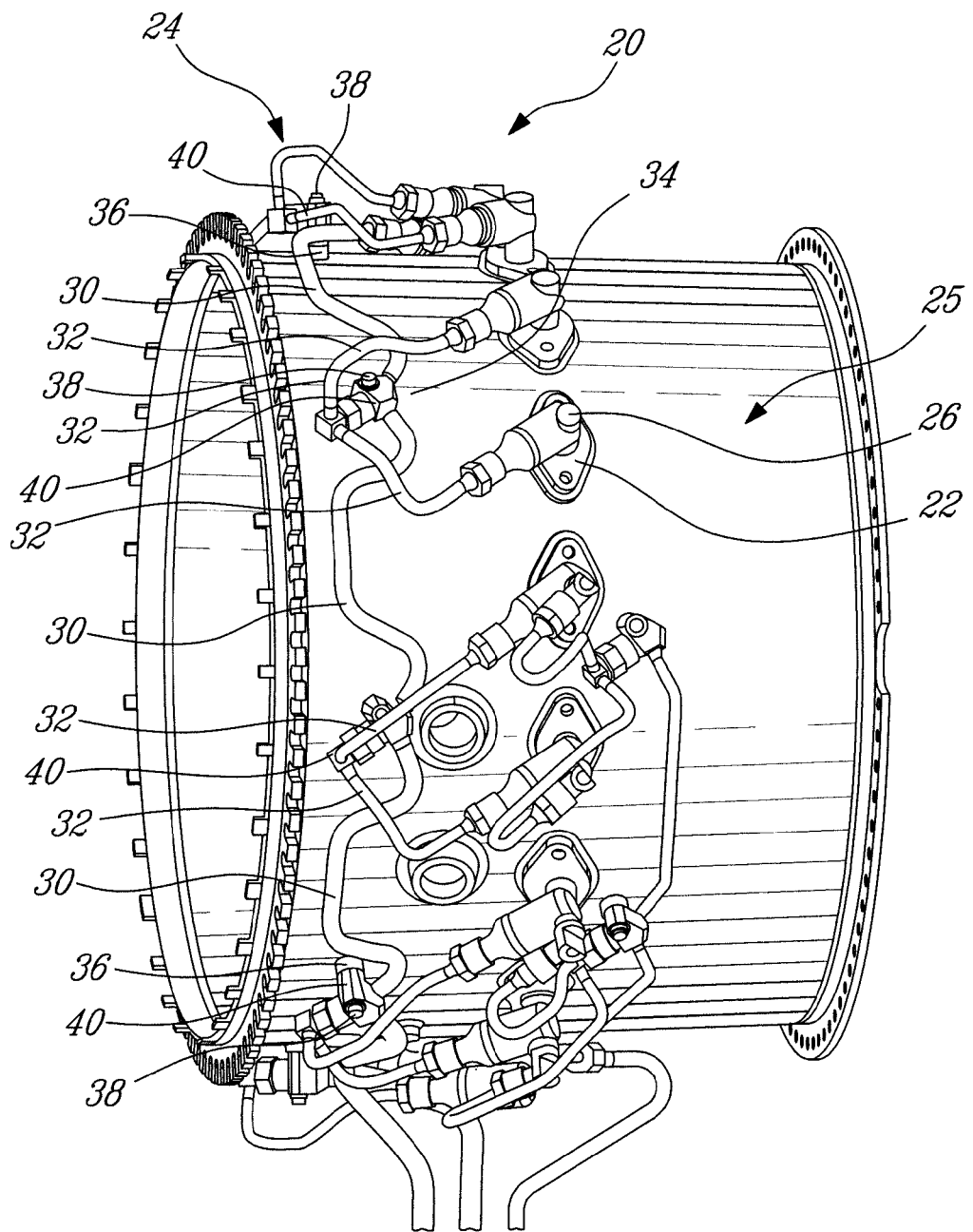
FIG. 2 is a side perspective view of a gas generator case of the gas turbine engine of FIG. 1, showing the fuel delivery system of the present disclosure thereon.

Referring to FIG. 2, the fuel delivery system 20 includes an external fuel manifold 24, disposed outside the combustor (or "gas generator") casing 25 and mounted thereto, and a plurality of fuel nozzles 22 which are connected in fuel flow communication with the external fuel manifold 24. The fuel manifold 24, which comprises a number of components which together make up its fuel-circulation network feeding the fuel nozzles 22, may be generally annular and extend circumferentially about the exterior of the combustor casing 25. Each fuel nozzle 22 includes a head portion or retainer member 26 which extends through openings in the casing 25 and a stem portion 23 (see FIG. 1) which extends from the head or retainer member 26 radially inwardly to the combustor 16. The retainer member 26 engages the fuel manifold portion 24 in a sealed manner within the casing 25. The stem portion 23 of each fuel nozzle provides fuel flow communication between the nozzle head/retainer member 26 located outside the casing 25 and fuel nozzle spray tips 27 (see FIG. 1) which are disposed on the inner ends of the stems 23 and extend into the combustor 16 for injecting fuel into the combustion chamber. Fuel is therefore distributed to each of the fuel nozzles 22 by the external fuel manifold 24 located outside of the combustor casing 25.

Although the retainer members 26 of the fuel nozzles 22 may be separate from the fuel nozzle stems 23 (i.e. the two parts are not integrally formed but are fastened together), it is to be understood that the retainer member 26 as described herein can also be integrally formed with at least the stem portion 23 of the fuel nozzles 22, wherein the retainer member 26 forms an integral nozzle head which is located outside of the casing 25 for engagement with the fuel manifold 24, but which is integrally formed with the stem 23 of the fuel nozzle. The retainer members 26 of the fuel nozzles 22 are therefore matingly engaged with the fuel manifold 24 outside of the casing 25.

Most known external fuel manifolds of the prior art comprise a main annular manifold body to which the fuel nozzles 22, via their externally projecting retaining members or heads 26, are directly connected. This direct connection is prone to wear and/or leaks, and makes in-field assembly or removal of the various components of the fuel system, especially individual fuel nozzles, difficult.

Referring again to FIG. 2 in more detail, the fuel manifold 24 of the present fuel delivery system 20 includes at least one (i.e. one or more than one) inlet manifolds 30 and a plurality of separate "jumper" tubes 32 which interconnect the inlet manifolds 30 with the fuel nozzles 22 such as to feed fuel thereto. The inlet manifolds 30 may be substantially rigid, and may therefore be made of a substantially inflexible and self-supporting material.

The jumper tubes 32 are, in at least a particular embodiment of the present assembly, more flexible than the rigid inlet manifolds 30, such as to permit the jumper tubes 32 to be able to absorb loads and/or otherwise more readily deflect if necessary. This greater flexibility and/or resiliency of the jumper tubes 32 may be enabled by their shape, wall thickness and/or material. In at least the depicted embodiment, the jumper tubes 32 have a hairpin-like shape, which improves their ability to absorb loads in comparison with the relatively more rigid inlet manifolds 30. Accordingly, because the jumper tubes 32 are used as an intermediate fluid-conveying connection between the fuel nozzles 22 and the more rigid inlet manifolds 30, the present assembly enables the supported weight of the fuel nozzles 22 to be divorced (i.e. separate and disconnected) from the supported weight of the inlet fuel manifold(s) 30. This is in contrast to the weight of these two components being combined for the purposes of being supported, which is the case when these two components are rigidly connected as in the prior art. Accordingly, the weight of the fuel nozzles 22 and the weight of the inlet fuel manifold(s) 30 are independently and directly born by the casing, and therefore the load imposed on the casing by one of the two components does not affect the other of the two components.

The rigid inlet manifolds 30 may comprise substantially rigid tubes which are fastened to the outer surface of the casing 25 by attachment mounts 34. The attachment mounts 34 may include case bosses 36 and corresponding manifold adaptors 40, which are together fixed in place to the outer surface of the casing 25 by mating fasteners 38, such as bolts or other suitable fastening elements. The bosses 36 may be threaded such as to receive the threaded fasteners 38 therein, and may be integrally formed with the casing 25 or alternately separately formed tubes which are retained in place on the casing 25 by the fasteners 38 or which may be alternately directly fastened to the casing (such as by welding or other direct fastening technique). In either case, the attachment mounts 34 enable multiple fuel inlet manifolds 30 to be the attached directly to the casing 25, without the need for any additional brackets, clamps, supports, etc., which are typically required in the prior art designs to locate and retain fuel manifolds to the core of the engine.

The bosses 36 of the attachment mounts 34 help retain the manifold adapters 40 in on the casing and at a radially elevated position such as to keep the manifold adapters 40 out of direct mating contact with the circumferential outer surface of the casing 25. The manifold adaptors 40 interconnect adjacent ones of the rigid inlet manifold tubes 30, and as such include a fluid passage therein which interconnects each of the rigid inlet manifolds 30 that is connected thereto. Each manifold adaptor 40 may have at least two inlet manifold tubes 30 mated therewith, and thus allows for fuel flow therethrough.

Each of the manifold adaptors 40, which interconnect circumferentially adjacent inlet manifold tubes 30, also have at least one (i.e. one or more than one) jumper tubes 32 connected thereto in fuel flow communication. Each jumper tube 32 feeds fuel flow to at least one fuel nozzle 22. As seen in FIG. 2, however, each manifold adaptor 40 may in fact have two or more jumper tubes 32 connected thereto, which each respectively feeds fuel to a fuel nozzle 22. In the depicted configuration, therefore, two fuel nozzles 22 are fed from each fuel inlet manifold 30, via its manifold adapter 40. However, depending on the particular design of the engine and resulting arrangement of the fuel nozzles (including, for example, the particular fuel nozzle inlet angles), one or more fuel nozzle 22 may be fed by each connection point with the inlet manifolds 30. The manifold adaptors 40 thus serve as connection points, or fluid conveying nodes, which interconnect at least two fuel inlet manifolds 30 and at least one jumper tube 32 that feeds the fuel to one of the fuel nozzle 22.

As such, the configuration of the present fuel delivery system 20 allows the majority, if not substantially all, of the weight of the fuel inlet manifolds 30 to be born by the casing 25, to which the inlet manifolds 30 are fastened via the attachment mounts 34. This accordingly allows the fuel nozzles 22, which are connected in fluid flow communication with the inlet manifolds 30 via the more flexible jumper tubes 32, not to bear any significant amount of weight and/or load of the fuel manifold. The jumper tubes 32 have a greater flexibility than the inlet manifold tubes 30 of the fuel manifold 24, or in other words, the fuel manifold is more rigid that the jumper tubes. Thus, as noted above, the present configuration enables the weight of the fuel nozzles 22 to be divorced from the weight of the inlet fuel manifold(s) 30, and vice versa.

The jumper tubes 32, which provide the fluid link between the fuel manifolds 30 and the fuel nozzles 22, are removably attached at respective ends thereof to the fuel manifold adapters 40 and the heads 26 of the fuel nozzles 22. Each of the jumper tubes 32 has an upstream end detachably connected to the fuel manifold 24 (via the adapters 40 thereof) and a downstream end detachably connected to one of the fuel nozzles 22. Accordingly, the end connections at each end of the jumper tubes 32 may be disconnected, in order to permit in-field service and/or replacement of individual components of the system, such as an individual fuel nozzle 22 for example. A single fuel nozzle 22 can therefore be individually removed, in the field if necessary, without having to modify ore remove the fuel manifold 24 or its inlet manifold tubes 30. Although numerous sealing, yet detachable, connections may be employed, in at least one embodiment double sealing Super-B™ nuts may be used to form the connection at each end of the jumper tubes (i.e. at the connection between the fuel manifold and the jumper tube as well as between the jumper tube and the fuel nozzle).

The above-described present fuel delivery system 20 provides weight advantages over previously employed external fuel manifolds of the prior art, and enables the weight of the fuel nozzles to be divorced from the weight of the fuel manifold, as a result of the greater load-absorbing characteristics of the jumper tubes relative to the fuel manifold, or in a particular embodiment the greater flexibility of the jumper tubes relative to the fuel manifold outside the casing of the combustor (and therefore the greater rigidity of the fuel inlet tubes of the fuel manifold). The greater flexibility of the jumper tubes enables them to elastically deflect more than the inlet manifold tubes of the fuel manifold when under load. The present fuel delivery system 20 also allows for the ability to feed two separate fuel nozzles from a single manifold, all while enabling improved ease of assembly and/or removal in the field.

The above description is meant to be exemplary only, and one skilled in the art will recognize that changes may be made to the embodiments described without department from the scope of the invention disclosed. For example, each jumper tube may feed fuel to one fuel nozzle, two separate fuel nozzles, or more than two if necessary. Additionally, although the fuel manifold is depicted as comprising a number of inlet manifold tubes 30 arranged circumferentially in series, separate inlet manifold tubes 30, feeding fuel in parallel rather than in series, may fed each of the manifold adaptors 40 to which the jumper tubes 32 are connected. Thus, depending on the particular design of the engine and the resulting arrangement of the fuel nozzles, one or more fuel nozzle 22 may be fed one or more inlet manifolds 30. Additionally, although FIG. 1 shows a turbofan engine, it is to be understood that the present fuel delivery system can be applied to other types of gas turbine engines, such as turboprop, turboshaft and industrial (i.e. non-airborne) gas turbine engines for example, as well as other fuel system components for such gas turbine engines. Still other modifications which fall within the scope of the present invention will be apparent to those skilled in the art, in light of a review of this disclosure, and such modifications are intended to fall within the appended claims.

The invention claimed is:

1. A fuel delivery system for a gas turbine engine having a combustor, a multistage compressor and a multistage turbine in serial flow communication within a surrounding core engine casing, the fuel delivery system comprising:
   an external fuel manifold disposed outside the core engine casing forward of the multistage turbine of the gas turbine engine, the external fuel manifold extending circumferentially around the casing and comprising a plurality of inlet manifold tubes circumferentially disposed in serial flow communication, each of the inlet manifold tubes being interconnected to a next circumferentially adjacent inlet manifold tube by a fixed manifold adapter directly fastened to an outer surface of the core engine casing at a first axial position;
   a plurality of circumferentially spaced apart fuel nozzles, the fuel nozzles having a radially outer end mounted to the core engine casing at a second axial position offset from the first axial position such that the fuel nozzles are axially spaced apart from the external fuel manifold on the outer surface of the core engine casing; and
   a plurality of jumper tubes disposed outside the core engine casing and interconnecting the fixed manifold adapters and radially outer ends of the fuel nozzles disposed outside the core engine casing, the jumper tubes feeding fuel flow from the external fuel manifold to the fuel nozzles, the jumper tubes having a rigidity that is less than that of the inlet manifold tubes of the external fuel manifold such that the jumper tubes elastically deflect under load.

2. The fuel delivery system as defined in claim 1, wherein the jumper tubes have a hairpin-like shape.

3. The fuel delivery system as defined in claim 1, wherein each of said inlet manifold tubes of the external fuel manifold feeds at least two fuel nozzles via said jumper tubes.

4. The fuel delivery system as defined in claim 1, wherein the jumper tubes elastically deflect more than the inlet manifold tubes of the external fuel manifold.

5. The fuel delivery system as defined in claim 1, wherein the jumper tubes have at least one of a shape, wall thickness and material which enables the jumper tubes to be more flexible than the inlet manifold tubes of the external fuel manifold.

6. The fuel delivery system as defined in claim 1, wherein the jumper tubes feed fuel flow from the external fuel manifold to radially projecting outer heads of the fuel nozzles disposed outside the casing.

7. The fuel delivery system as defined in claim 1, wherein each manifold adapter has two jumper tubes connected thereto, each of the two jumper tubes feeding fuel to a separate one of the fuel nozzles.

8. The fuel delivery system as defined in claim 1, wherein each of the jumper tubes has an upstream end detachably connected to the external fuel manifold and a downstream end detachably connected to one of the fuel nozzles such as to permit removal of the jumper tube while the external fuel manifold remains fastened in place on the casing.

9. The fuel delivery system as defined in claim 8, wherein the fuel nozzles are removably mounted to the casing, such that individual removal of the one of the fuel nozzles is enabled, following removal of the jumper tube, while the external fuel manifold remains fastened in place on the casing.

10. The fuel delivery system as defined in claim 1, wherein each said manifold adapter is fastened to the casing by attachment mounts including a boss disposed on the outer surface of the casing and a mating threaded fastener which engages the boss to fasten the external fuel manifold to the casing.

11. A gas turbine engine including a multi-stage compressor, a combustor and a multi-stage turbine in serial flow communication, the gas turbine engine comprising:
    a core engine casing enclosing the multi-stage compressor, the combustor and the multi-stage turbine;
    an external fuel manifold disposed outside the core engine casing, the external fuel manifold being disposed forward of the multistage turbine, the external fuel manifold including a plurality of inlet manifold tubes interconnected by fixed manifold adapters, the fixed manifold adapters being directly fastened to an outer surface of the core engine casing;
    a plurality of circumferentially distributed fuel nozzles fastened to the core engine casing and each having a radially outer end thereof which is disposed outside the core engine casing and axially spaced apart from the external fuel manifold such that the radially outer ends of the fuel nozzles are axially offset from the fixed manifold adapters the external fuel manifold on the outside of the core engine casing; and
    a plurality of jumper tubes disposed outside the core engine casing and interconnecting in fuel flow communication the radially outer ends of the fuel nozzles and the fixed manifold adapters of the external fuel manifold, both of which are disposed outside the core engine casing and fixed thereto, the jumper tubes having a flexibility that is greater than that of the external fuel manifold such that the fuel nozzles bear substantially none of the load imposed on the core engine casing by the weight of the external fuel manifold.

12. The gas turbine engine as defined in claim 11, wherein the external fuel manifold is substantially more rigid than the jumper tubes.

13. The gas turbine engine as defined in claim 11, wherein the external fuel manifold includes a plurality of inlet manifold tubes circumferentially disposed in serial flow communication, each of the inlet manifold tubes being interconnected to a next circumferentially adjacent inlet manifold tube by a manifold adapter.

14. The gas turbine engine as defined in claim 13, wherein each of the inlet manifold tubes feeds two of the fuel nozzles via two jumper tubes, the two jumper tubes being connected to one of the manifold adaptors.

15. The gas turbine engine as defined in claim 11, wherein each of the jumper tubes has an upstream end detachably connected to the external fuel manifold and a downstream end detachably connected to one of the fuel nozzles, such as to permit removal of the jumper tubes while the external fuel manifold remains fastened in place on the casing.

16. The gas turbine engine as defined in claim 15, wherein the fuel nozzles are removably mounted to the casing, and an individual one of the fuel nozzles is removable from the casing while the external fuel manifold remains fastened in place on the casing.

\* \* \* \* \*